(12) United States Patent
Eilinger

(10) Patent No.: US 6,742,630 B2
(45) Date of Patent: Jun. 1, 2004

(54) SUPER-CAPACITOR ENERGY STORAGE UNIT FOR ELEVATOR INSTALLATIONS

(75) Inventor: Thomas Eilinger, Morristown, NJ (US)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 10/239,948
(22) PCT Filed: Mar. 21, 2001
(86) PCT No.: PCT/CH01/00174
§ 371 (c)(1), (2), (4) Date: Sep. 24, 2002
(87) PCT Pub. No.: WO01/74699
PCT Pub. Date: Oct. 11, 2001

(65) Prior Publication Data
US 2003/0089557 A1 May 15, 2003

(30) Foreign Application Priority Data
Mar. 31, 2000 (EP) ............................... 00810271

(51) Int. Cl.$^7$ ................................................ B66B 1/06
(52) U.S. Cl. ....................................... 187/290; 187/296
(58) Field of Search ................................. 187/290, 296, 187/293, 297; 307/66, 69; 318/375, 376, 377, 106, 108, 109, 382, 161

(56) References Cited
U.S. PATENT DOCUMENTS 3,914,674 A * 10/1975 Maynard ................... 388/819
4,310,785 A * 1/1982 Iwata ...................... 315/241 P
4,456,097 A * 6/1984 Salihi ......................... 187/289
5,058,710 A * 10/1991 Iwasa ......................... 187/290
5,572,108 A * 11/1996 Windes ....................... 320/167
5,703,456 A * 12/1997 Cox ............................ 318/701
5,712,456 A * 1/1998 McCarthy et al. .......... 187/290
5,783,928 A * 7/1998 Okamura .................... 320/122
5,896,948 A * 4/1999 Suur-Askola et al. ....... 187/290
6,068,078 A * 5/2000 Rau et al. .................... 180/446
6,108,223 A * 8/2000 Julian et al. .................. 363/78
6,460,658 B2 * 10/2002 Suga et al. .................. 187/290
6,474,447 B2 * 11/2002 Tajima et al. ............... 187/290
2002/0179376 A1 * 12/2002 Tominaga et al. .......... 187/290

* cited by examiner

Primary Examiner—Jonathan Salata
(74) Attorney, Agent, or Firm—Schweitzer Cornman Gross & Bondell LLP

(57) ABSTRACT

Elevator installations with electric drive systems are equipped with devices (10) to reduce the power supply connection rating which have energy storage units (11) which are formed entirely or partly from so-called supercapacitors (13). The device (10) according to the invention has the effect on the one hand that power peaks during starting and braking operations are compensated by the exchange of energy between the storage unit (11) and motor supply, and on the other hand that the power consumption occurring during a trip is also spread over a part of the at-rest time. Supercapacitors (13) as energy stores tolerate by comparison with electrochemically acting accumulators a much higher number of charging and discharging cycles at high values of current.

7 Claims, 4 Drawing Sheets

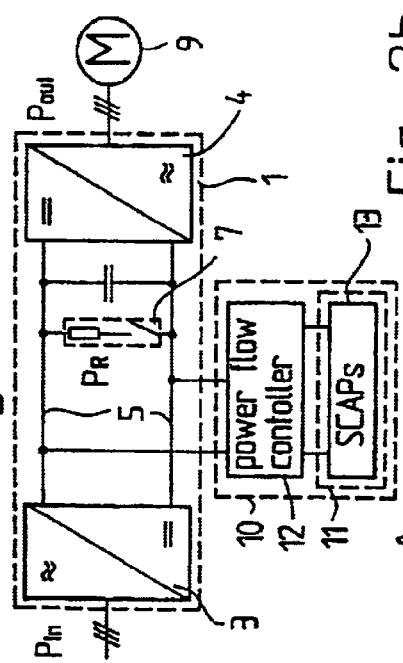
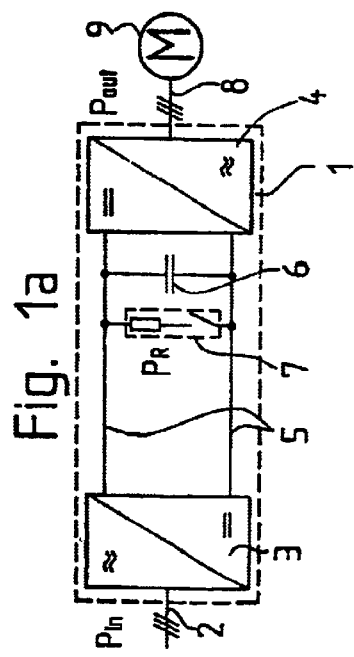
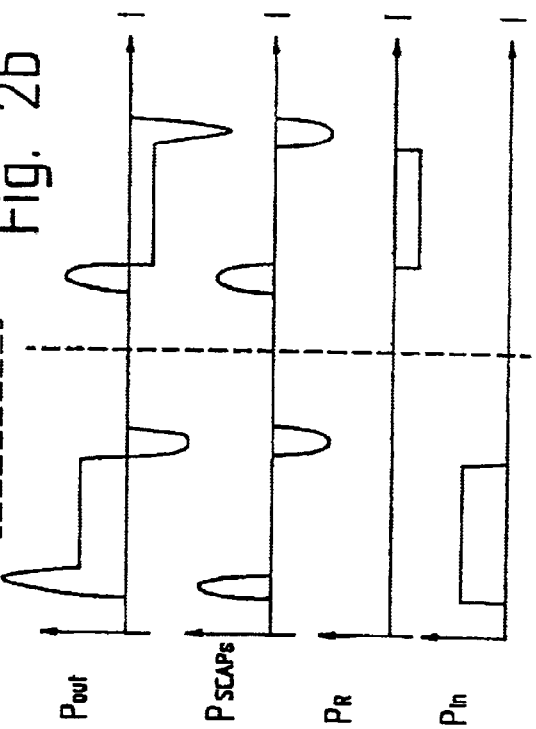
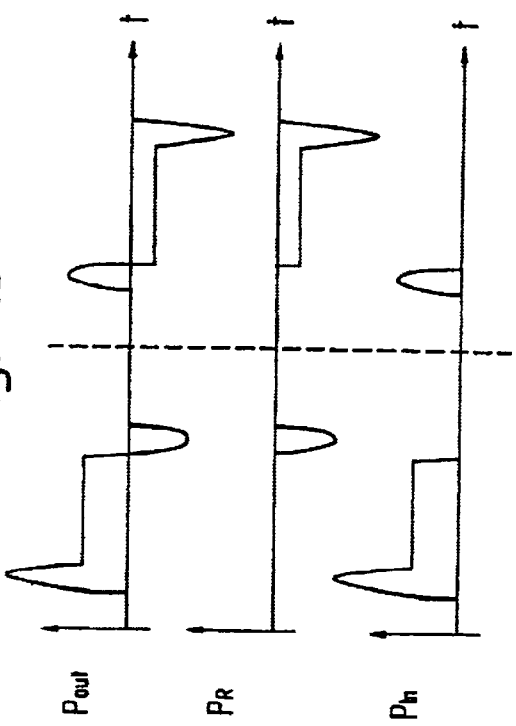

SUPER-CAPACITOR ENERGY STORAGE UNIT FOR ELEVATOR INSTALLATIONS

The invention relates to a device for reducing the power supply connection rating required for elevator installations with electric hoisting drives which has an energy storage unit for electrical energy, and to a method serving the same purpose.

BACKGROUND OF THE INVENTION

Passenger and freight elevators are usually driven by electric motors. Various principles of transmitting the hoisting force to the elevator car are used. In one embodiment, a rotation motor acts directly, or via a gearbox, on a traction sheave which drives suspension ropes which support and move the elevator car at one end and a compensating weight at the other end. In another embodiment, a rotation motor drives a hydraulic pump which in essence actuates via a hydraulic fluid the piston rod(s) of one or more hydraulic cylinder(s) which drive the elevator car directly or via driving ropes. According to a further drive principle the elevator car, or its compensating weight connected to it by suspension ropes, is moved up and down by means of a linear motor. In modern elevator installations, regulation of the elevator car speed usually takes place by means of a regulated change in the frequency of the alternating current of the motor.

Common to all these drives is that during acceleration and braking phases the electric motors consume 2 to 4 times more electric power than when traveling at constant speed, that the driving power required differs greatly depending on the respective car load, and that the ratio between the daily running time of these electric motors and their at-rest time is generally very low, for example less than 10%.

The brief power peaks when starting and braking affect the dimensions, and therefore the costs, of power supply cables, transformers, EMC power supply filters, fuses, and switchgear. A further disadvantage of the power peaks described is that they can cause voltage fluctuations in the power supply, and thereby negatively affect the illuminating quality of lamps or the functioning of electronic devices. Futhermore, in many places the briefly occurring power peaks described result in higher recurring charges for connection to the power supply.

However, the dimensions of the components of the power supply connection, and some components of the power supply to the drive, as well as the size of the recurring consumption-related power supply connection charges, depend mainly on the power drawn during the relatively short running time of the elevator drive motor, even if the average power requirement is only a fraction of this quantity.

EP 0 645 338 B1 describes a device for elevator installations with an energy storage device whose operating principle is not described in greater detail. This energy storage device is continuously charged with direct current by a charging device which is permanently supplied from the power supply. When peak power is required, stored energy is fed to the drive system in addition to a limited component of energy which is taken directly from the power supply. By limiting the power drawn directly from the power supply to a value which lies below the power required by the drive for travel at constant speed, the energy consumption which occurs during the time of travel can also be distributed over the time during which the elevator is at rest, in that during the time of travel the accumulator supplies the difference in power and is charged again during the at-rest time. In this way, a value for the power supply connection rating can be achieved which is below the power required for travel at constant speed.

EP 0 645 338 B1 quotes the state of the art according to GB 2 139 831 and DE 3 743 660 in which energy storage devices based on accumulators are described. Neither in the description nor in the claims of EP 0 645 338 B1 is a reference to any other storage principle to be found. The energy storage device, which is not described in more detail, is fed by a charging device with a rapid charge mode and trickle charge mode as is usual for accumulators. In view of these facts, it is assumed that the energy storage device referred to in EP 0 645 338 B1 is an electrochemical accumulator (secondary element).

For use as the sole means of energy storage, electrochemical accumulators have a number of important disadvantages. Large peaks in power requirement can only be met by accumulators with extremely large dimensions whose service life, which is short anyway, is drastically reduced by frequent withdrawal of peak energy. The very limited value of charging current allowed for an accumulator also greatly restricts the frequency with which the need for peak power can be met. This limitation on the allowable value of charging current is also a serious obstacle to the recuperation of braking energy into an accumulator.

BRIEF SUMMARY OF THE INVENTION

The object of the present invention is to create a device for reducing the power supply connection rating of elevator installations of the type described above which avoids the disadvantages stated. In particular, the device shall be capable of compensating high and frequent power peaks, have a long service life, and through its ability to absorb energy rapidly, be able to store recuperated braking energy temporarily as it occurs.

This objective is met by the present invention in the form of a device to reduce the power supply connection rating of elevator installations with electric drive systems having an energy storage unit for electric energy, and characterized in that this energy storage unit contains capacitors in the form of supercapacitors, and a method to reduce the power supply connection rating of elevator installations with electric drive systems, characterized in that electric energy is stored in an energy storage unit (11) which contains capacitors in the form of supercapacitors (13) and that before each elevator trip the energy required for the forthcoming trip is determined from the available information such as the load situation and trip destination, that a check is made whether the momentarily present energy content of the energy storage unit (11) together with the continuous supply from the power supply is sufficient for the trip, and that if necessary the start is delayed until the energy storage unit is sufficiently charged.

The invention is based on the idea of using innovative capacitors, so-called supercapacitors, instead of, or in combination with, accumulators as energy stores, the usual arrangement employed consisting of several supercapacitors connected in series, having a total capacitance of several farads at allowed voltages from 100 to 300 volts. Supercapacitors are double-layer capacitors whose electrodes consist of active carbon and therefore have effective surfaces of several thousand square meters per gram of carbon, the two electrodes being separated by minimal distances in the nanometer range. These characteristics result in the extremely high capacitance of these energy stores, which are commercially available from specialist suppliers.

The device according to the invention for reducing the power supply connection rating of elevator installations, where a large number of starting and braking operations cause high power peaks, has many advantages. By comparison with energy stores based on accumulators, supercapacitors have the following very positive characteristics:

- Practically unlimited service life by comparison with accumulators.
- High allowable charging and discharging power with a large number of charging and discharging cycles and low weight (power density of supercapacitors approx. 10–15 kW/kg; power density of accumulators approx. 300–1000 W/kg).
- Complete charging and discharging is guaranteed even with high charging and discharging currents.
- No maintenance is required.
- They contain no toxic or environmentally harmful substances.
- Low weight compared with accumulators having the same power density.

For applications in which the device according to the invention serves to compensate for power peaks and also, if necessary, to reduce the power supply connection rating by a relatively modest amount, it is expedient to use an energy storage unit which uses supercapacitors only as storage medium.

For applications in which the device according to the invention serves not only to compensate for power peaks but also to reduce the power supply connection rating of the elevator installation far below the energy required for travel at constant speed, it is advantageous to use an energy storage unit consisting of a combination of supercapacitors with electrochemically acting secondary elements (accumulators), since the latter, by comparison with supercapacitors, have a higher energy density (Wh/kg), i.e. have a higher storage capacity for the same weight. By suitably limiting the power drawn from the power supply, it can be so distributed over running time and at-rest time that the required power supply connection rating can be reduced to a fraction of the power required for travel at constant speed. This is made possible in that during phases in which the power of the motor is higher than the limited power drawn from the power supply the difference in power is fed from the energy storage unit, brief current peaks being taken mainly from the supercapacitors and longer constant power mainly from the accumulator, and that especially during at-rest times the energy storage unit is recharged.

According to a further embodiment of the invention, in elevator installations which have no power supply connection at all, or only one with a minimal power supply connection rating, a combination of an energy storage device made from supercapacitors and fuel cells, i.e. with electrochemically acting primary elements, can be used. In this case, the electric energy required for driving is wholly or partly generated in the fuel cells, whereas the supercapacitors serve as energy stores to cover power peaks and to distribute the power consumption over part of the elevator at-rest times.

A preferred embodiment of the device to reduce the power supply connection rating of elevator installations according to the invention acts in conjunction with one or more frequency converter(s). In each case one of these serves to regulate the rotational speed of one associated elevator drive motor. In essence, a frequency converter consists of a power converter, a voltage-controlled DC link with smoothing capacitor, and an inverter with control generator. In embodiments in which the power converter is not intended for recuperation of braking energy, the DC link is usually equipped with a braking module. The device according to the invention, which contains an energy storage unit of supercapacitors, or of a combination of these with an accumulator, takes energy (also braking energy) from the aforementioned voltage-controlled DC link and returns the energy to it during drive situations which require greater electric power than is supplied by the power converter with its limited current. In this case, a regulating and controlling unit known as a power-flow controller ensures adaptation as necessary of the DC voltage between the energy storage unit and the DC link, and regulates the exchange of energy between this energy storage unit and the DC link of the frequency converter.

An advantageous further development of the device according to the invention to reduce the power supply connection rating of elevator installations is achieved in that the power generated by the drive motor during braking phases, including the power peaks then generated, is recuperated into the supercapacitors of the energy storage unit. When doing so, if their charge capacity is exceeded, the power-flow controller stops the flow of energy into the energy storage unit, as a result of which the voltage in the DC link of the frequency converter increases until the braking module is activated, which uses a braking resistor to convert the excess electric braking energy into heat. By recuperating the braking energy into the energy storage unit, the costs for energy consumption can be effectively reduced, in contrast to recuperation into the power supply, which is usually not considered as a reduction in energy consumption.

In elevator installations in which one or more elevator vehicle(s) with integral drive system travel, it is advantageous to install the frequency converter, the elevator control unit, and the device according to the invention to reduce the power supply connection rating, in mobile fashion on the elevator vehicle(s). Each energy storage unit of the vehicles is then charged either via contact elements or by means of contactless energy transmission systems. As well as reducing the power supply connection rating required, this method has the advantage that devices for the supply of energy are not required along the entire length of travel. This is of particular interest in elevator installations where there are several elevator hoistways and the elevator vehicles change the elevator hoistways in which they travel, horizontal travel also taking place.

On elevator installations having several elevators adjacent to each other which are equipped with frequency-converter controlled drives, it is advantageous to connect the DC links of all the inverters on the motor side in parallel, and to supply them with power through a single power supply module. Connected to this common DC link is a single device to reduce the power supply connection rating of elevator installations according to the invention having an energy storage unit of supercapacitors, if necessary in combination with accumulators. As a result, energy compensating processes can take place directly between the individual motors, i.e. braking energy occurring momentarily from one or more drive motor(s) is used directly by one or more other momentarily driving drive motors(s). Further important advantages of this embodiment are that only one single energy storage unit with its control electronics, only one power supply module, and only one single braking module are required. In suitable cases, e.g. on groups with several elevators, and where energy recuperated into the power supply also pays for itself, it is expedient to recuperate excess braking energy into the power supply by means of a recuperation unit, in which case the braking module can be dispensed with.

On installations where the available power supply connection rating is less than the power required for travel at constant speed, i.e. where it is essential during such travel to supply additional energy from an energy storage unit, it is expedient to check the present energy supply situation before travel commences. The elevator control operates according to an energy management process which determines the energy required for the forthcoming trip based on available information about the load in the car and the trip destination, and then checks whether the energy content momentarily available in the energy storage unit together with the limited, continuous supply from the power supply, is sufficient for the trip. If necessary, the start is delayed until the energy storage unit is sufficiently charged.

BRIEF DESCRIPTION OF THE DRAWINGS

Three exemplary embodiments of the invention are described further by reference to the attached drawings. The drawings show:

FIG. 1a A diagrammatic representation of an elevator drive with frequency converter without the device to reduce the power supply connection rating according to the invention.

FIG. 1b Diagrams with power flow curves typical for elevator drives.

FIG. 2a A diagrammatic representation of an elevator drive with frequency converter, equipped with the device according to the invention, which contains supercapacitors for buffering power peaks.

FIG. 2b Diagrams with exemplary curves of the power flows modified by this device.

DETAILED DESCRIPTION OF THE INVENTION

Figure 3A:
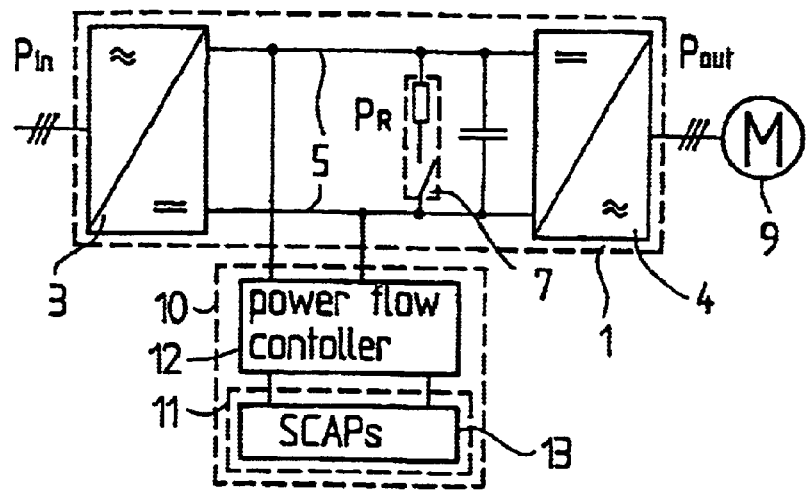
FIG. 3a A diagrammatic representation of an elevator drive with frequency converter, equipped with the device according to the invention, which contains supercapacitors to reduce the power supply connection rating by a relatively small amount.

In FIG. 1a the diagrammatic representation of an elevator drive shows 1 a normal frequency converter without a device according to the invention to reduce the power supply connection rating, consisting of power supply connection 2, power converter 3, inverter 4, voltage-controlled DC link 5, smoothing capacitor 6, braking module 7 (with braking resistor and brake operating switch), and motor connection 8. 9 indicates the speed-regulated three-phase alternating current motor of the elevator drive.

The diagram in FIG. 1b shows for elevator drives typical power flows in the components involved during one trip cycle and their dependence on time t. In each case, the left-hand side of the diagram relates to a drive situation where the torque resulting from the car load on the one hand and the counterweight on the other hand acts against the direction of the drive (positive load), and the right-hand side of the diagram relates to a drive situation where the torque resulting from the car load and counterweight acts in the direction of the drive (negative load). $P_{out}$ is the output power drawn by the three-phase motor 9 from the frequency converter 1, $P_R$ is the braking power recuperated from the three-phase motor 9 and converted into heat in the braking module 7, and $P_{in}$ is the power drawn by the frequency converter from the power supply. It can be seen that the entire driving power, including the starting power peaks, is drawn from the power supply ($P_{in}$) and the entire braking power recuperated from the three-phase motor 9 is converted into unusable heating power $P_R$ in the resistor of the braking module 7.

FIG. 2a again shows diagrammatically an elevator drive with frequency converter 1, which consists of the same components as those described in FIG. 1a, but which is equipped with the device 10 according to the invention to reduce the power supply connection rating. In the version shown, the device consists of an energy storage unit 11 formed of supercapacitors 13, and a power flow regulator 12. This power flow regulator has, on the one hand, the task of adjusting the energy flow between the different voltage levels of the DC link 5 and the energy storage unit 11, and charging this energy storage unit when there is excess energy. On the other hand, when the requirement is greater, the power flow controller 12 feeds the stored energy back into the aforementioned DC link 5. When doing so, it uses a measurement of the current flowing to the inverter 4 from the DC link 5 to apply to this DC link 5 the current needed to reduce the power supply connection power peaks without affecting the voltage of the DC link. In the version described in FIG. 2, the total capacitance of the series-connected supercapacitors 13 is designed exclusively for buffering such power peaks.

FIG. 2b shows the diagrams already explained under FIG. 1b relating to the time-dependent behavior of the power flows in the components involved. Shown here in addition as $P_{SCAPs}$ is the power flow between the DC link 5 and the energy storage unit 11 formed from supercapacitors 13. It can be seen that the power $P_{in}$ drawn from the power supply is reduced to the value required for acceleration-free travel without peaks, most of the braking energy recuperated from the three-phase motor 9 being still converted into unusable heating power $P_R$ in the resistor of the braking module 7.

FIG. 3a again shows an elevator drive with a frequency converter 1 as described in FIGS. 1a and 2a. Similar to the drive shown in FIG. 2a, the embodiment described here has the device 10 according to the invention to reduce the power supply connection rating, which contains the energy storage unit 11 formed of supercapacitors 13 and a power flow controller 12. However, the total capacity of the energy storage unit described here is not only designed for buffering power peaks, but so large that during an elevator trip a considerable proportion of the electric power required can be fed from the energy storage unit 11 into the DC link 5 of the frequency converter 1. This feeding of power is regulated as described in FIG. 2a by the power flow controller 12 and takes place in addition to the supply of power from the power supply through the power converter 3, which is limited to a certain value. The energy storage unit 11 is charged on the one hand during the at-rest times of the elevator from the DC link 5 fed by the power converter 3, and on the other hand by braking energy recuperated from the three-phase motor 9 via this DC link. This recuperation of braking energy into the energy storage unit 11 takes place until the limit of its charge capacity is reached. Electric energy which can no longer be stored is then converted into heat in the braking module 7. The recuperation of braking energy effects a very substantial reduction of the energy consumption of the installation and thereby also the power supply connection rating needed. Since the total running time of an elevator is usually only a fraction of the at-rest time, this method also brings the advantage that a substantial proportion of the quantity of energy drawn during the running times from the three-phase motor 9 is taken from the power supply spread in time over the entire readiness time of the elevator, which further reduces the power supply connection rating needed for the installation. The supercapacitors 13 enable adequate storage capacity for this method to be made available, enabling high power peaks to be compensated and, before the service life is exhausted, for a number of charging and discharging cycles to take place which is a factor of ten higher than for accumulators.

Figure 3B:
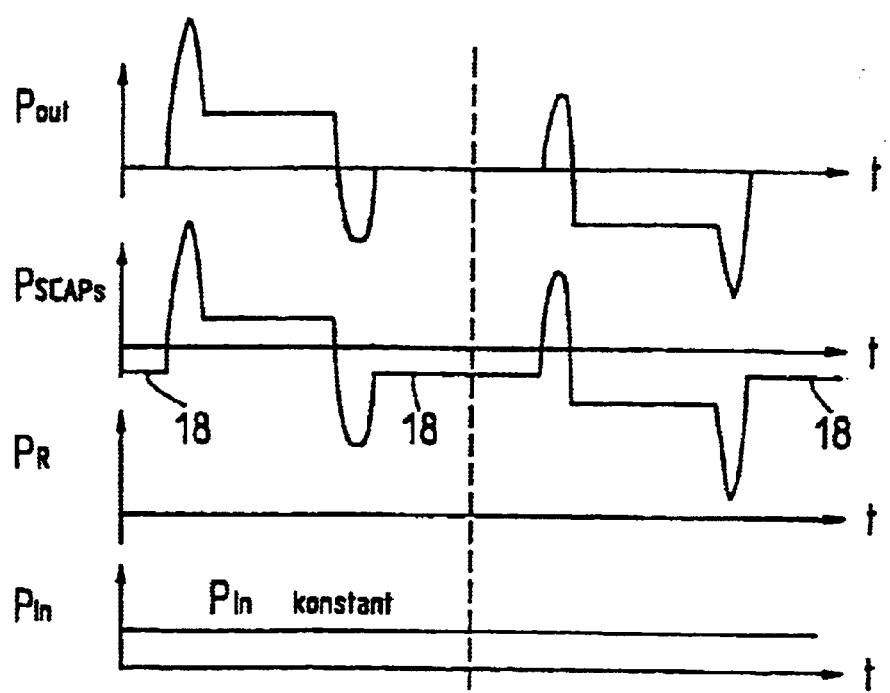
FIG. 3b Diagrams with exemplary curves of the power flows modified by this device.

FIG. 3b again shows the diagrams already explained relating to the time-dependent behavior of the power flows in the components involved. 18 indicates the time ranges during which a charging current flows into the energy storage unit 10. It can be seen that a significantly greater power flow $P_{SCAPs}$ takes place between the DC link 5 and the supercapacitors 13 of the energy storage unit 11 than in the embodiment described in FIG. 2a, that in the normal case no braking power $P_R$ flows into the braking module 7, and that the power supply connection rating $P_{in}$ is reduced to a value which lies below the power required for a trip at constant speed. Ideally, the total capacity of the supercapacitors 13 and the limitation on the power $P_{in}$ drawn from the power supply are so defined that $P_{in}$ remains approximately constant while the elevator is in operation.

Figure 4A:
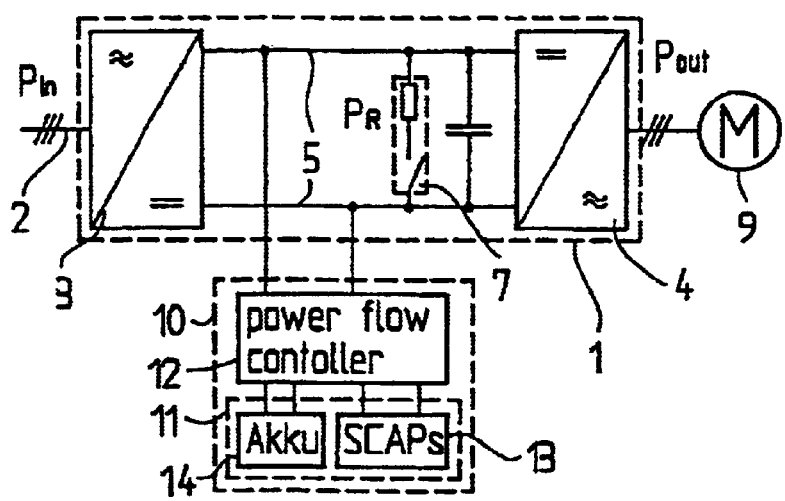
FIG. 4a A diagrammatic representation of an elevator drive with frequency converter equipped with the device according to the invention, which contains supercapacitors in combination with accumulators to reduce the power supply connection rating by a large amount.

FIG. 4a shows a further embodiment of an elevator drive with a frequency converter and the device 10 according to the invention to reduce the power supply connection rating. Similar to that described in FIG. 3a, the version of the device shown here contains an energy storage unit 11 and a power flow regulator 12, the energy storage unit 11 consisting of supercapacitors 13 connected in parallel with an electrochemically acting accumulator 14. Such an arrangement can fulfil the requirements of an energy storage unit 11 for an elevator drive in an ideal manner, since the supercapacitors 13 tolerate the high, pulse-shaped charging and discharging currents, and the accumulator is especially suitable for charging and discharging currents which are lower but last longer. A power flow regulator developed for this combination ensures that the power peaks occurring during starting and braking operations are largely compensated by the supercapacitors 13, that a substantial proportion of the braking energy recuperated during trips with negative load is stored in the accumulator 14, that this is charged during the entire at-rest time from the DC link 5 of the frequency converter 1, and that during unaccelerated phases of trips with positive load this gives up its stored energy to the DC link in addition to the limited supply of power from the power converter 3. With the technique described, it is possible to draw an even greater proportion of the quantity of energy consumed by the three-phase motor 9 during the travelling times distributed in time over the entire readiness time of the elevator, which reduces the power supply connection rating of the installation to a fraction of that required for a trip at constant speed. Because the accumulator 14 is supplied from the DC link 5, it is not necessary to have a separate charging device connected to the power supply 2.

Figure 4B:
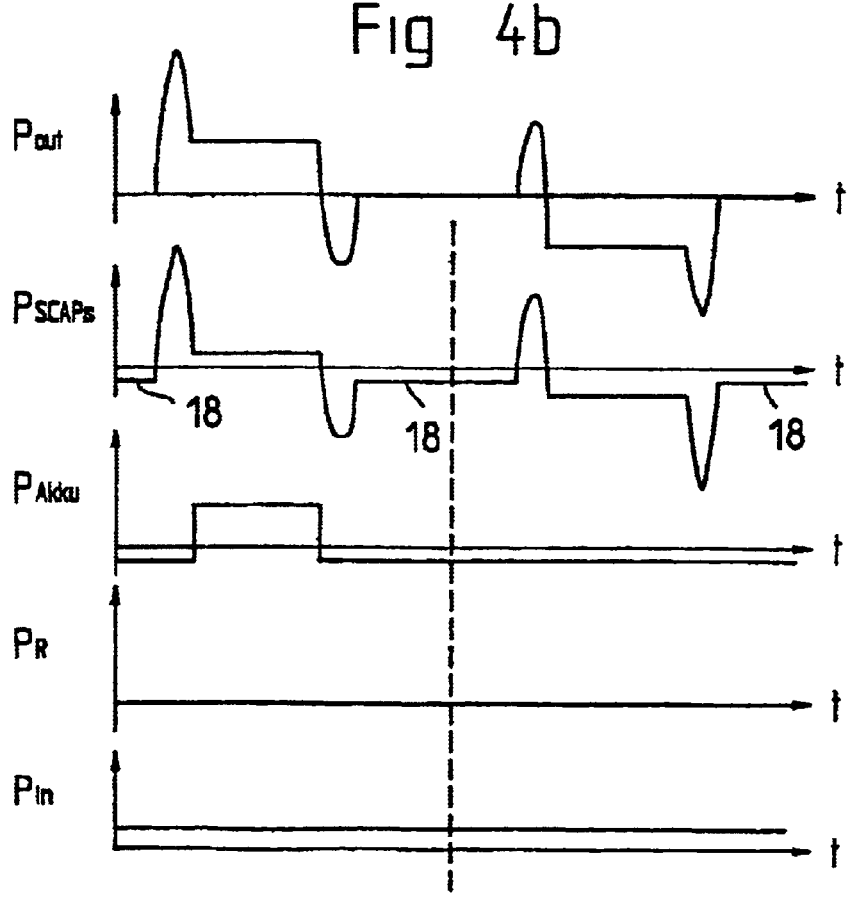
FIG. 4b Diagrams with exemplary curves of the power flows modified by this device.

FIG. 4b shows the known diagrams relating to the time-dependent behavior of the power flows in the components included in FIG. 4a. An additional curve designated $P_{Akku}$ illustrates the power flow between the accumulator 14 and the DC link 5. 18 indicates the time ranges during which a charging current flows into the supercapacitors 13 or the accumulator 14. It can be seen from these diagrams that with the device to reduce the power supply connection rating described here, in the normal case no braking power $P_R$ recuperated from the three-phase motor 9 is converted into heat in the resistor of the braking module 7, but is fed to the combined energy storage unit 11 for temporary storage, and that the required power supply connection rating $P_{in}$ then corresponds to only a fraction of the power required for a trip at constant speed.

Figure 5:
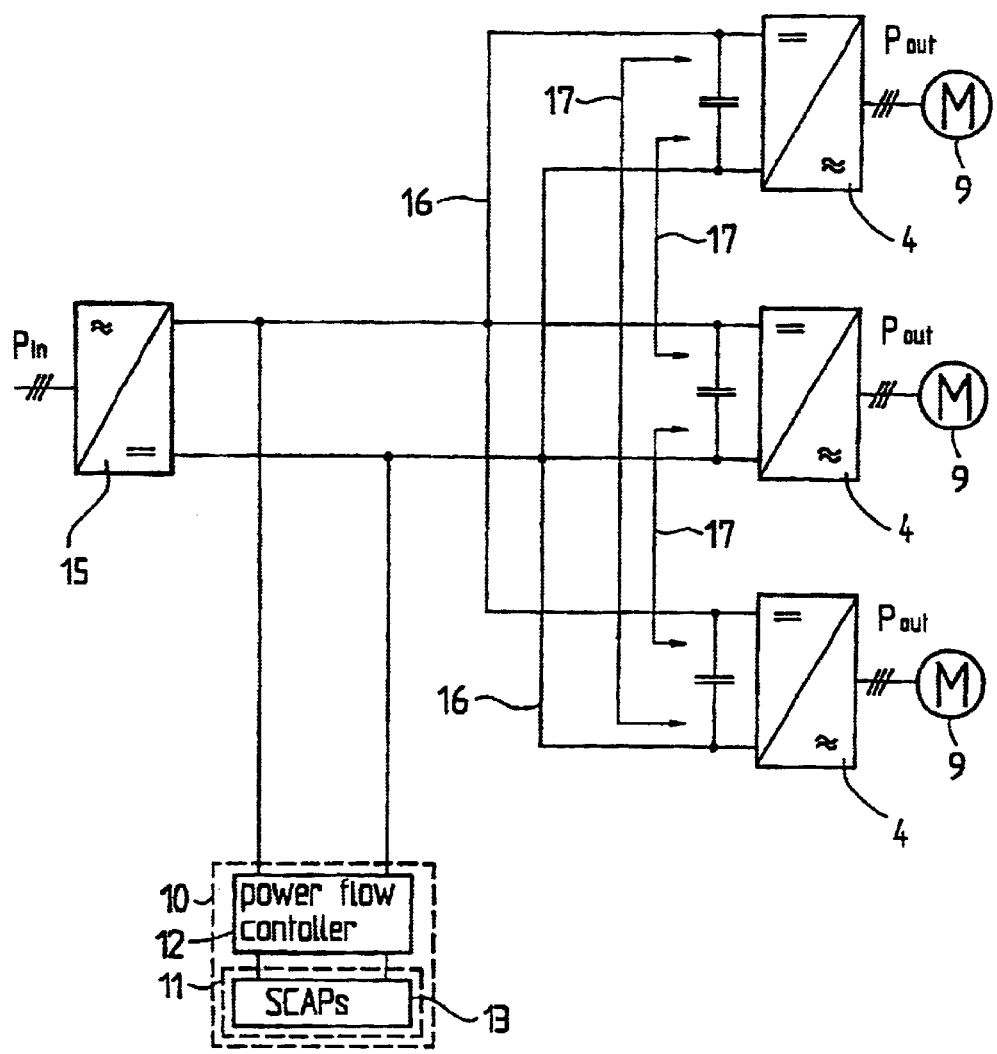
FIG. 5 A diagrammatic representation of a parallel connection of several DC links of frequency converters of a group of elevators.

FIG. 5 shows diagrammatically the arrangement of frequency converter drives of a group of several elevators. Assigned to each of the three-phase motors 9 is an inverter 4, and all these inverters are supplied from a common DC link 16. Connected to this DC link 16 is a device 10 according to the invention to reduce the power supply connection rating, consisting of the energy storage unit 11 and the power flow regulator 12. Such an arrangement enables the compensating processes, symbolized by arrows 17, between the power flows to and from the individual three-phase motors 9, as a result of which the capacity of the energy storage unit 11 required for a desired reduction in the power supply connection rating is substantially reduced. Normally, the energy storage unit 11 in such an arrangement consists entirely of supercapacitors 13. Here, the supply of energy to this common DC link 16 take place via a single power supply module 15. This acts on the one hand as a power converter and on the other hand as a recuperation unit. In its function as recuperation unit the power supply module recuperates into the power supply that part of the electric braking energy recuperated from the three-phase motors 9 which can neither be used for the aforementioned compensating processes nor absorbed by the energy storage unit 11 when it is fully charged. This dispenses with the braking modules which are usually integrated into separate DC links.

What is claimed is:

1. Device to reduce the power supply connection rating of elevator installations with electric drive systems, the device comprising an energy storage unit (11) for electric energy having capacitors in the form of super capacitors (13) and a separate smoothing capacitor.

2. Device according to claim 1, characterized in that the energy storage unit (11) contains as storage medium only super capacitors (13).

3. Device according to claim 1, characterized in that the energy storage unit (11) contains as storage medium a combination of supercapacitors (13) with accumulators (14), i.e. with electrically-acting secondary elements.

4. Device according to one of claims 1 to 3, further comprising one or more frequency converters (1) with each of which the rotational speed of an associated three-phase elevator motor (9) and thereby the traveling speed of a corresponding elevator is regulated.

5. Device according to one of claims 1 to 3, characterized in that braking energy which occurs is fed into the energy storage unit (11) until its capacity is fully utilized and that if the need arises excess braking energy is converted into heat in a braking module (7) of a frequency converter (1).

6. Device according to one of claims 1 to 3, characterized in that in a group of several elevators with frequency-controlled drives the DC links (5) of several motor-side inverters are connected in parallel to a common DC link (16) and supplied with power from a single power supply module (15), and that a single energy storage unit according to the invention (11) is connected to the common voltage-controlled DC link (16).

7. Method to reduce the power supply connection rating of elevator installations with electric drive systems, characterized in that electric energy is stored in an energy storage unit (11) which contains capacitors in the form of supercapacitors (13) and a separate smoothing capacitor (6) and that before each elevator trip the energy required for the forthcoming trip is determined based on available information such as the load situation and trip destination, that a check is made whether the energy content momentarily present in the energy storage unit (11) together with the continuous supply from the power supply is sufficient for the trip, and that if necessary the start is delayed until the energy storage unit is sufficiently charged.

* * * * *